Figure 1:
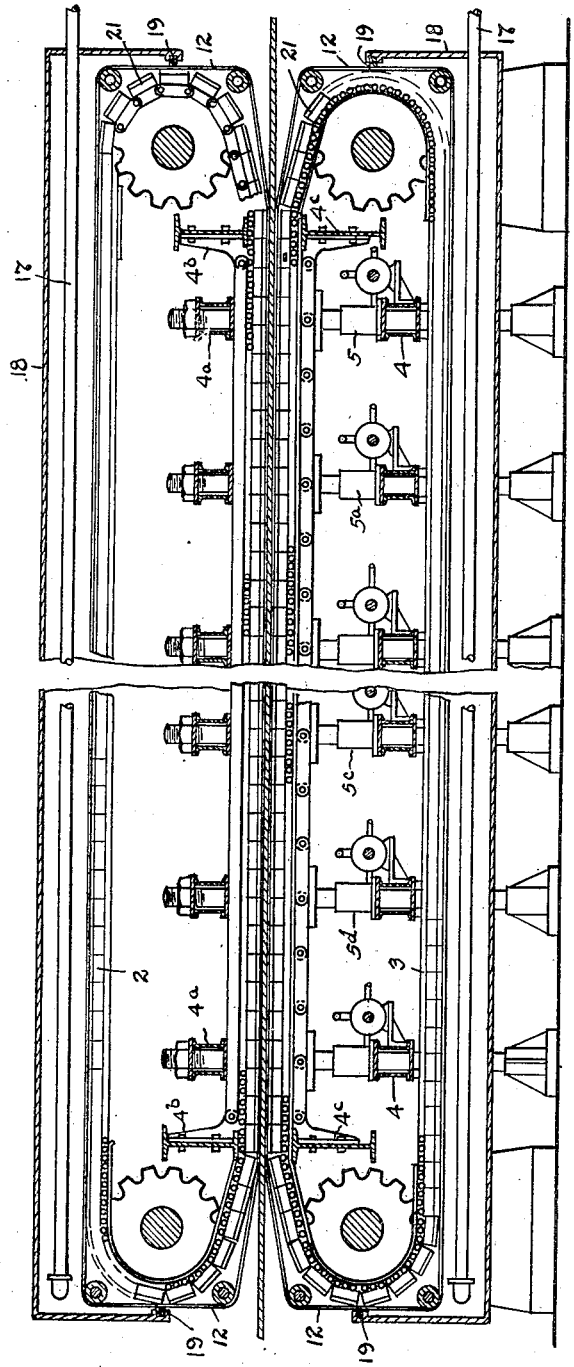
Figure 6:
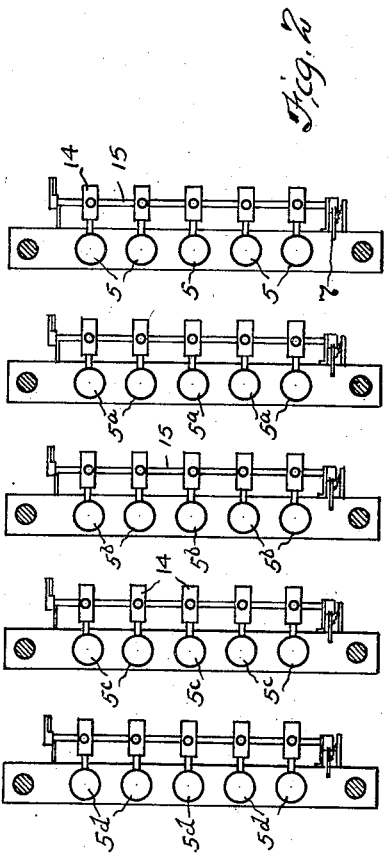

INVENTOR.
Theodore Williams Dike
BY
Fay, Oberlin & Fay
ATTORNEYS.

Feb. 23, 1937.  T. W. DIKE  2,071,999
CONTINUOUS PRESS FOR PRODUCTION OF BOARD LIKE PRODUCTS
Filed March 17, 1934   2 Sheets-Sheet 2

INVENTOR.
Theodore Williams Dike
BY
Fay, Oberlin & Fay
ATTORNEYS.

Patented Feb. 23, 1937

2,071,999

UNITED STATES PATENT OFFICE 2,071,999

CONTINUOUS PRESS FOR PRODUCTION OF BOARD-LIKE PRODUCTS

Theodore Williams Dike, Seattle, Wash., assignor to I. F. Laucks, Inc., Seattle, Wash., a corporation of Washington Application March 17, 1934, Serial No. 716,122

15 Claims. (Cl. 144—279)

The present invention relates to a continuous press for the manufacture of plywood and, more particularly, embodies improvements in the means for applying pressure and supplying heat, whereby hitherto insuperable obstacles to successful commercial operation are avoided. By continuous press, I mean a machine capable of applying the necessary bonding pressure, with or without heat, for gluing together the component sheets of veneer, while the assemblies are continuously progressing forward in succession, as on a conveyor. By plywood, I mean panels composed of two or more plies of porous sheet material glued together.

For many years it has been a dream of plywood manufacturers to do their gluing operation continuously on a conveyor, instead of discontinuously, as in an ordinary press. The advantages in the way of labor and machine efficiency, uniform good quality of product, and economy of production are all strongly in favor of the continuous process, and this has long been recognized by the trade. However, notwithstanding many attempts to solve the problems involved, including the construction of several expensive but abortive machines, no satisfactory practical solution has been found, and the batch method is still universal.

Aside from the mechanical difficulties involved in the construction of a successful continuous press, another hitherto insuperable obstacle has been the non-availability of a sufficiently quick-setting adhesive to permit the press itself to be reasonable in length and hence in cost. The available glues for plywood may be roughly divided into cold press glues and hot press glues, according to whether or not heat is required to set them up. As the hot press glues are much quicker-setting, they are the most suitable for continuous pressing. Even with the latter there has been another serious obstacle to the use of a continuous press in that hitherto no process has been known for using hot press glues which did not require that the panels be both heat-treated to bonding temperature while under pressure, and also held under pressure until the formation of the bond was completed. Solutions to these underlying problems have now been found and form the subject-matter of co-pending applications. A particularly suitable quick-setting adhesive is set forth in the co-pending application of Albert Henry Bowen and Theodore Williams Dike, Serial No. 666,930, and a process permitting the heating up of the face plies, to be performed before the assembly is pressed, as well as a portion of the setting of the glue to be performed subsequent to pressing, is set forth in my co-pending application Serial No. 716,122.

It is recognized, therefore, that, aside from the solution of the mechanical difficulties involved in continuous pressing, the economic practicability of the present machine is greatly dependent on the availability of the aforementioned quick-setting adhesive, together with a process for using it, which relieves the continuous press itself of a considerable proportion of the work which it has hitherto been considered necessary that such a press should perform.

Nevertheless, the continuous press herein set forth depends for its success on new and useful elements of design and combination of elements, and I do not wish to restrict the present invention to use only with the aforementioned adhesive or process, but construe the invention broadly as applicable to all work for which the novel design is suitable.

To the accomplishment of the foregoing and related ends, the invention, then comprises the features hereinafter fully described, and particularly pointed out in the claims, the following description setting forth in detail certain illustrative embodiments of the invention, these being indicative however, of but a few of the various ways in which the principle of the invention may be employed.

Figure 3:
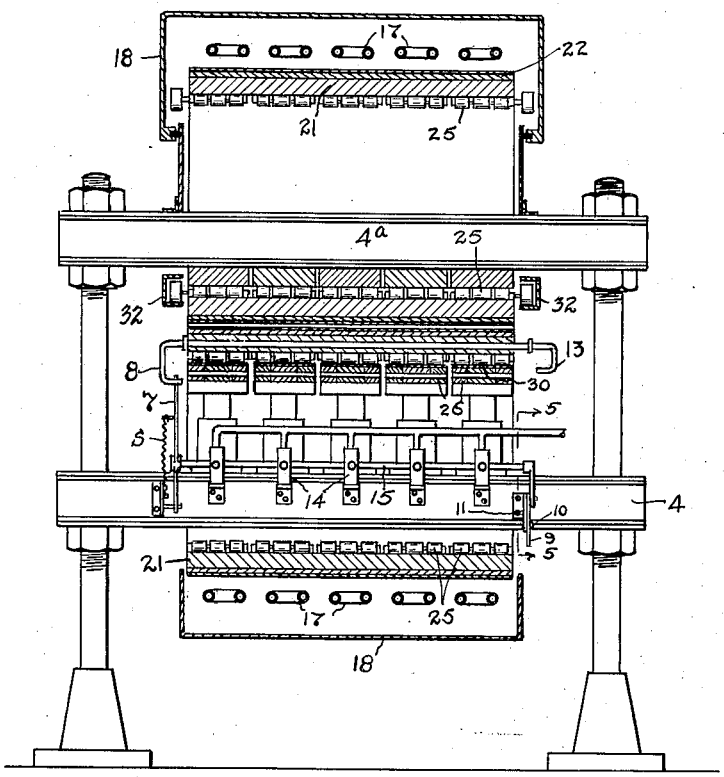
Figure 4:
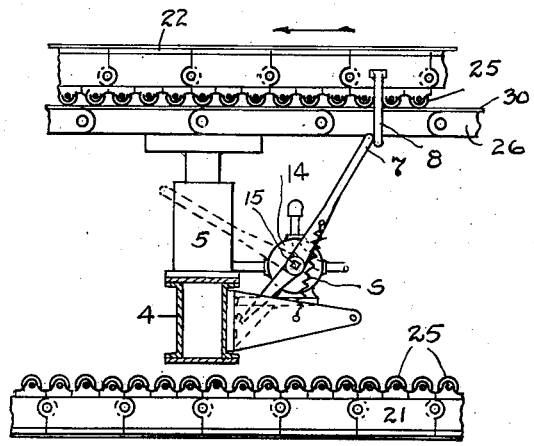
Figure 5:
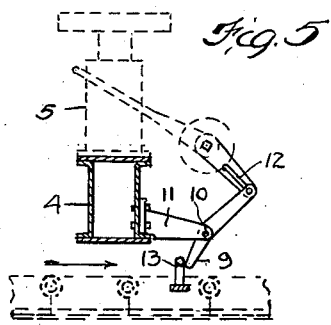

In said annexed drawings:

Fig. 1 is a longitudinal vertical sectional view of the embodiment of the invention; Fig. 2 is a fragmentary transverse sectional view taken on a plane showing the arrangement of hydraulic rams; Fig. 3 is a transverse vertical section; and Figs. 4 and 5 are sectional details.

My invention for continuously applying pressure, or heat and pressure, includes a pair of conveyor or tractor belts 2, 3, one being superimposed above the other, with the lower run of the upper belt running close to or just above the upper run of the lower belt, and both being driven by suitable means at synchronous speed, so that the work contacting runs of the two belts will serve to hold and convey the assemblies between them. Pressure is transmitted to the panel assemblies by forces tending to press the two runs of belt against the interposed ply material. As the pressures involved in bonding plywood are very considerable, running often to 200 lbs. per sq. in. of panel surface, the portion of the tractor belts which is under pressure is provided with some form of anti-friction track rigidly supported, and the anti-friction track is interposed between the pressing means and the tractor belt, so that the pressure devices press against the anti-friction track, and the latter against the tractor belt. Thus the elements of synchronous pressure applying conveyors contacting with the work, anti-friction track, and pressure applying means, are provided in any continuous press design.

In a continuous hot press, that is a continuous press designed for applying heat in addition to pressure for setting hot press glues, together with the necessary pressure, a source of heat must be provided and means for efficiently transmitting the heat to the work. In addition, it is advisable that either the surface of the tractor belt, when in the flattened position, must itself be smooth and continuous so as not to mar the plywood, or else, if irregularities of surface as for instance between the links of the tractor belt exist, it is necessary to interpose a smooth, continuous sheet metal belt to bridge them over, and prevent marring. In such a press, comprising the elements of a pair of tractor belts faced with sheet metal belts to transmit pressures of the order of 200 lbs. per sq. in. of belt surface, a serious problem of injury and deformation of the moving pressing means also arises whenever material is pressed which is narrower than the width of the pressure area. The same problem also arises whenever sudden variations occur in the thickness of the material being pressed, as when filling the empty machine. The magnitude of the stresses encountered can readily be understood when it is considered that a machine working under conditions requiring the application of pressure for 1 minute, when run at a speed of 60 feet per minute, will require the application of 3,600 tons pressure, if the material is 50 inches wide and requires a bonding pressure of 200 pounds per square inch. Any inequalities in the thickness or the width of the material running through the machine will result in the concentration of this enormous force on a lesser area, and in the case of only half the width of the machine being filled and the pressure still being applied over the entire area, there will be a pressure of 1,800 tons unsupported and a pressure of 3,600 tons concentrated on one-half the whole area, or a force of 400 pounds per square inch, instead of 200 pounds per square inch. Likewise, when the empty machine is being filled, the head of the procession of panel assemblies as it enters the machine will have to pick up an enormous concentration of pressure, and the same problem will be encountered when the full machine is being emptied. The stresses involved are far beyond the safe loads of ordinary construction materials, and would require a prohibitively costly and massive machine to resist them.

It will be noted that stresses of this sort fall into two classes, either a line of force longitudinally of the machine, as in the case of pressing panels narrower than the width of the machine, or a line of force transversely across the width of the machine, as in the case of filling the empty machine or emptying it, or in the case of gaps between successive assemblies within the machine.

After long investigation and experiment, I have found a solution of the difficulty relating to longitudinal stresses by providing pressure applying means in longitudinal rows of relatively small elements, as for instance rows of small hydraulic jacks carried on suitable framing elements 4, the rows being individually controlled as to the application of pressure. Small hydraulic jacks are particularly adapted for such control, as it can readily be obtained by a simple super-control piping of each longitudinal row of jacks separately, with suitable valves to shut off rows which come over idle pressure area, as when it is desired to feed narrow panels into a wide machine. Rows of springs might theoretically be so controllable, but practically they are unsuitable as a longitudinal control could be obtained only by changing the thickness of cumbersome longitudinal spacers.

Furthermore, I have found that arrangement in rows also provides a satisfactory solution to the problem of transverse pressure control. To accomplish this, I arrange the hydraulic jacks 5, 5a, 5b, 5c, 5d, etc., in rows also transversely across the width of the pressure area, and provide means for controlling the pressure in transverse rows individually, with respect to the pressure in other rows. I accomplish this by providing each transverse row with a common valve operating lever, so that the valves 14 in each jack in the row can simultaneously be opened to a pressure applying position, or closed to non-pressure applying position, by the common transverse control rod 15. By providing each transverse valve control rod with an extension lever 7 projecting above one of the tractor belts close to but outside its edge, the pressure may be applied successively as the machine is filled, and be shut off successively as the machine is emptied, and this may be accomplished by carrying on the edge of one of the belts a block or cam to shift the valve operating levers as it passes by. Desirably, the trip-on cam 8 may project from a slide mounting in the belt, and may be set in or out to strike the valve levers or not, as required. A shut-off lever control 9 fulcrumed at 10 in bracket 11 may have a pin and slot connection 12 to shut the valves, when trip-off cam 13 (preferably also on a slide mounting) is set to strike the lever 9. A spring S may be provided for steadying.

Another problem is the tendency to crumpling and cracking of warped veneer when panel assemblies enter the press. In a batch press where the platens move slowly vertically, the veneer is stationary and irregularities in warped veneer are gradually flattened out, so that this effect is avoided; but in a continuous press, if the full pressure is applied too abruptly, the straightening action on warped veneer is also too sudden and serious difficulty results. Likewise, if a protective sheet metal belt is superimposed over the pressure applying tractor belt, a serious crumpling effect is encountered by this belt. If made of unsuitable material this will cause the metal in the protective belt to flow and soon destroy it. In order to avoid these difficulties, I arrange guides for the tractor belt on the entrance and exit ends in such a manner as to cause the belts to converge very gradually before the pressure area is reached, and furthermore, in order to avoid too sudden application of pressure, I arrange for a short zone of very moderate pressure at both the entrance and exit ends. This is readily accomplished by arranging jacks to first apply only a fraction of full pressure for a short distance, and is arranged by local reduction either of jack ram area, number of jacks, or service fluid pressure.

While it is theoretically possible to machine metallic links in a conveyor chain in such a manner that they will present a smooth, continuous surface when the chain is stretched out, as distinguished from the irregularity when the chain is flexed as in turning a sprocket, nevertheless, despite careful machine work, slight irregularities and openings exist and even though they are too slight to mar the plywood panels, they afford an opportunity for small particles of dust and chips to enter the links where the material becomes highly compressed, owing to falling down into the openings between individual links, when they are flexed in going over the sprockets, and remaining there exerting a wedging and bursting force when the links are stretched out in the straight position. For this I use sheet metal belts 12 over the tractor belts for protective purposes and as a belt of this character has a useful bridge effect, I find that it relieves one of the necessity of machining the individual tractor links so accurately and thus effects an economy.

Moreover, in practice I have found that particular characteristics in the protective belt are essential to successful use, principally because of the tendency for the sheet metal belt to become distorted by flow of the metal itself in the repeated stresses due to unavoidable inequalities in local pressure on the plywood, especially at the edges of the stream of panels and at the slight gaps between individual panels, which in practice cannot always be perfectly butted one against the other. I have found a solution of this difficulty in using a protective sheet metal belt of definite characteristics, namely one that is both high in elastic limit and high in fatigue resistance to flexing. An example of a particularly suitable material for such a belt is the commercial copper-silicon-manganese alloy known as "Everdur". As a further protection against unnecessary flexing, I prefer to have it sufficiently long so that it can be supported on rollers placed beyond the sprockets which drive the tractor belt.
No separate provision for driving such belt is required as the frictional resistance to slippage on the tractor belt in the pressure zone is ample to provide a drive. This arrangement avoids the flexing which would otherwise occur at the open joints of the traction belt when the latter passes over the sprockets. It is, therefore, a feature of my machine to provide protective belts to actually contact both sides of the plywood assemblies. These perform the following functions: (1) Protect the tractor belt from injury by dirt and chips, (2) bridge small openings in the joints of the tractor belt so that the pressing surface is smooth and continuous, (3) provide a pressing surface that is easily cleaned, (4) resist deformation. If the protective belts be provided with perforations without interfering with desired smoothness of surface, moisture vapor can readily escape.

An example of a continuous press designed to run at a speed of up to 60 feet per minute and to apply pressure up to 200 pounds per square inch of panel surface, with panels 50 inches wide, will require the following arrangement of hydraulic jacks, if the service pressure available is 2,500 pounds per square inch: Longitudinally there will be ten rows of thirty jacks in a row on 5 inch centers across the width of the pressure area, and on 24 inch centers lengthwise. These jacks will have rams each 3 7/8 inches in diameter and will in the aggregate apply 3,600 tons pressure. Under such an arrangement cutting off a row of jacks lengthwise would narrow the pressure zone 5 inches, while cutting off a row crosswise will shorten it 24 inches. Each jack will be provided with a suitable 2-way valve. When the valve plug is rotated in one direction the service pressure will be directly connected and the return circuit to the hydraulic pump will be disconnected. In the opposite position, the service pressure will be disconnected from the ram and the return circuit connected. The valve plugs in each row can be moved to the pressure or exhaust position, by a common motion of the connecting rod.

Whenever a continuous press of my improved design is used as a hot press, it is desirable to specially provide for the best possible transfer of heat to the glue line of the panels which are being pressed, as thereby the length of time during which they must remain in the pressure zone is shortened, with consequent shortening of the machine and reduction in its cost. It is possible to enclose the whole machine and provide a source of heat, such as steam pipes, within the enclosure so that the whole mass of material is brought to the desired temperature. This is of advantage particularly when the machine is being employed for hot pressing or drying wet sheets of cellulose material as for instance veneer panels containing much moisture, pulp boards and the like, requiring a relatively large input of heat. Under conditions requiring only a relatively small input of heat however, I prefer to store the necessary heat for converting the glue within the tractor belt itself, and provide special means for transferring the necessary heat units with the greatest possible speed to the glue line. To accomplish this, I arrange the return non-pressure runs of the upper and lower tractor belts to run on level tracks, so that the upper (or lower) surface in the non-pressure zones will be substantially level and true, except in the area that is provided for movement round the driving and tail sprockets.
I then provide a series of steam pipes 17 rigidly supported as close as possible to the flat surfaces of the tractor belts in the two flat non-pressure zones, and an enclosure or housing 18 with heavily insulated surfaces to contain the steam pipes, so that they are carried in an insulated box open only on the side toward the tractor belt. This box or jacket, in turn, is supported as close as possible to the belt and not touch it, and the opening between it and the belt is further closed by a soft rim of packing or gasket material 19 of a yielding nature, such as felt, so that the flow of heat derived from the steam pipes in the box is as nearly as possible wholly into the tractor belt. By this means I find it possible to store the required heat units in the tractor belt, enabling a more efficient transfer of heat to the work and minimizing the heat losses into the parts of the machine, which it is not desirable to heat. This also provides for greater accessibility for the machine, as the parts between the two runs of each of the belts may be either left entirely open and accessible, or in any case enclosed with doors which are easily opened, while the machine is in operation, without interfering with the proper application of heat to the work.

Having thus stored the heat necessary for operation with hot press glues within the tractor belt itself, I further provide special means whereby it may be stored in the belt more efficiently and transferred to the work more rapidly. To accomplish this, I provide that the principal framework and metal mass of the individual tractor links 21 be constructed of a ferrous metal such as steel, or, still better, cast iron, which is high in capacity for storing heat. Particularly suitable materials for the purpose are some of the modern grades of cast iron, which possess nearly the strength of steel and are superior to it in heat storage capacity such as the recently developed nickel alloys of cast iron. Having provided the necessary storage capacity in the main mass of the links of the tractor belts, I further provide for its efficient transfer to the work by a facing 22 for the links with a metal high in conductivity, aluminum being particularly suitable. As the interposed Everdur belt, while it needs to be only 1/32 inch in thickness, is nevertheless of a material of not very good conductivity, an aluminum facing on the tractor links is particularly important in securing the most rapid possible flow of the stored heat into the glue line of the plywood, which is being pressed.

With all these factors, in the aggregate their combined effect is very great and they serve to make it possible to do a great amount of work in a machine which is relatively short and consequently inexpensive. This is particularly desirable in connection with the use of a hot press glue such as described in copending application Serial No. 666,930, which is a condensation product of zinc chloride, urea, and formaldehyde, capable of setting in an extremely short time, and under conditions which indicate that the requirement for setting is the influence of a definite temperature for a definite time. For instance, I have found that this adhesive is readily set under one set of conditions in 1 minute at 250° F. and under another set of conditions in the same time at 230° F., the difference being only that in the first instance the heating surface was steel and in the second instance of heating surface was aluminum, in both cases the time being the same. In this case it appears that the greater conductivity of the aluminum supplied the necessary heat units in the same time as the steel despite a lower temperature. The same principle applies in my improved design for a continuous hot press and by using cast iron tractor belts faced with aluminum I am able to improve the efficiency of the machine materially with adhesives of this character, by providing in the cast iron element a member of relatively high heat storage capacity and in the aluminum facing a cooperating member of relatively high conductivity to speed up delivery of the heat to the work.

In constructing the anti-friction track element a desirable arrangement includes rollers 25 supported on anti-friction bearings, the rollers being arranged to travel on a smooth continuous metal track 26, extending the full length of the pressure zone. The anti-friction bearings should be provided with roller bearings of suitable design and the rollers themselves should be of material length and diameter appropriate for the portion of the pressure load which they must sustain. The smooth, continuous track may be either separate from the tractor belt and the rollers supported on it and forming a part of the links, or a reverse arrangement is feasible. However, I prefer to have the rollers form a part of the tractor links and the track be separate from them. In the latter arrangement, the tractor links roll along the tracks and the pressure is transmitted from the jacks to the track and thence through the rollers to the tractor links. In this arrangement the main structure of the tracks may be a succession of articulated sections, each section being substantially the same length as the longitudinal spacing between the pressure jacks, for instance 24 inches, and the articulated joints be in the form of a hinge, so that small movements in the track are possible to conform to the varying positions of the rams which apply the pressure. In that case there is a tendency for the rollers on the tractor links to encounter irregularities at the articulated joints of the track and as the pressures are very high, such action is detrimental. I find that this difficulty may be easily prevented by superimposing upon the articulated tracks a strip of spring steel 30, upon which the rollers travel, which serves as a bridge across the joints between individual sections of the track and provides means for distributing irregularities over a greater length. This strip of steel may conveniently be made in one piece the same length as the pressure zone. The expansion and contraction of this long strip, due to heat, presents no problem as the spring steel is free to push out at the ends without encountering any obstruction. By this means the smoothness of the track upon which the heavily loaded rollers must travel is preserved and yet it is given necessary flexibility to accommodate the slightest movements essential to the proper functioning of the hydraulic rams which apply the pressure. In practice I prefer to have as many articulated tracks as there are longitudinal rows of rams, so as to make the distribution of pressure as flexible as possible.

It is unnecessary to provide for duplicate pressure applying means to act against both the upper and lower tractor belts. A most efficient arrangement is to have the roller tracks for the upper tractor belt rigidly supported (as for instance by framing elements 4a, 4b), continuous, and without articulation, and apply the working pressures entirely through a series of jacks acting upon articulated tracks supporting the pressure zone of the lower belt only. I prefer however, to provide channel guides 32 for the pressure zone of the upper belt so that it cannot drop down by its own weight. With this arrangement the weight of the pressure zone of the lower track belt itself is sufficient to move the rams in the hydraulic jacks downward and open the press whenever the rams are connected with the nonpressure return circuit of the pump and disconnected from the pressure circuit.

Other modes of applying the principle of the invention may be employed instead of these herein explained, change being made as regards the details described, provided the features stated in any of the following claims, or the equivalent of such, be employed.

I therefore particularly point out and distinctly claim as my invention:—

1. Machinery of the character described, which comprises cooperating pressure-belts, means for driving said belts, means for supporting said belts, a series of hydraulic rams for applying pressure to said belts, and means for controlling said rams by groups.

2. Machinery of the character described, which comprises cooperating pressure-belts each with articulated links and means for storing and giving up heat, said means including a conductive facing and a less conductive backing, rail-means along which the links travel, rollers between the links and rails, and means for applying pressure.

3. Machinery of the character described, which comprises cooperating pressure-belts each with articulated links and means for storing and giving up heat, said means including a ferrous metal body and an aluminum face, and means for applying pressure to the links.

4. Machinery of the character described, which comprises cooperating pressure-belts, a series of hydraulic rams in transverse rows for applying pressure to the belts, control valves for said rams, and means for actuating the valves for each transverse row of rams together.

5. Machinery of the character described, which comprises cooperating pressure-belts each including articulated links, means for driving said belts, rollers on each link, rail means against which the rollers travel, and strips of resilient metal interposed between the rails and the rollers.

6. Machinery of the character described, which comprises cooperating pressure-belts each including articulated links of ferrous metal, an aluminum facing on each said link, and means for applying heat to such facings.

7. Machinery of the character described, which comprises cooperating pressure-belts, means for driving said belts, a series of hydraulic rams in transverse rows for applying pressure, valve means for controlling said rams, a control lever and rod for actuating the valve means for each transverse row of rams together, and trip means on the belt for operating said control lever.

8. Machinery of the character described, which comprises upper and lower pressure-belts having outside and cooperating inside runs, said belts including articulated links, rollers on said links, rails against which the rollers travel, the rails for the upper belt being fixed, a series of hydraulic rams under the inside run of the lower belt for applying pressure, and a protective belt between each said belt and the work.

9. Machinery of the character described, which comprises upper and lower pressure-belts having outside and cooperating inside runs, said belts including articulated links, rollers on said links, fixed rails for the upper belt, floating rails for the lower belt, resilient metal strips on said floating rails, means under the inside run of the lower belt for pressing same against the upper belt, belt-actuated means for controlling the pressing means to press and to release, and a protective belt between each said belt and the work.

10. Machinery of the character described, which comprises upper and lower pressure-belts having outside and cooperating inside runs, said belts including articulated links, rollers on said links, fixed rails for the upper belt, floating rails for the lower belt, resilient metal strips on said floating rails, a series of hydraulic rams under the inside run of the lower belt for pressing same against the upper belt, belt-actuated means for controlling the hydraulic rams to press and release, and a protective belt between each said belt and the work.

11. Machinery for manufacture of board-like material, which comprises pressure-belt conveyor means, means for driving the same, heat-storing units on said pressure-belt conveyor means, a heat-applying means for suppling heat to said heat-storing units, said heat-applying means being in operative relation to said heat-storing units only outside of the pressure zone, fluid-pressure means for applying pressure without interfering with the movement of said pressure belt conveyor means, and means for supplying and releasing fluid pressure for said fluid-pressure means.

12. Machinery for manufacture of board-like material, which comprises pressure-belt conveyor means, means for driving the same, heat-storing units on said pressure-belt conveyor means, a heat-applying means for supplying heat to said heat-storing units, said heat-applying means being in operative relation to said heat-storing units only outside of the pressure zone, and means for applying pressure without interfering with the movement of said pressure-belt conveyor means.

13. Machinery for manufacture of board-like material, which comprises pressure-belt conveyor means, means for driving the same, means on said pressure-belt conveyor means for storing and carrying heat, means outside the pressing zone for applying heat to said means for storing and carrying heat, and means for applying pressure without interfering with the movement of said pressure-belt conveyor means.

14. Machinery of the character described, comprising endless pressure belts having cooperating and non-cooperating run portions, means for driving said belts, means for supporting said belts, and means localized exclusively to the non-cooperating run of said belts for storing heat therein.

15. Machinery of the character described, comprising cooperating pressure-belts having pressure-applying and non-pressure-applying runs, means for driving said belts, means for supporting said belts, and means for storing heat in predetermined amount in said belts localized exclusively to the non-pressure-applying run of their travel whereby during the first portion of the pressure-applying run the work is rapidly brought to the desired working temperature and then the input of heat diminishes due to the progressive exhaustion of the supply of stored heat.

THEODORE WILLIAMS DIKE.